(12) United States Patent
Lee

(10) Patent No.: US 7,884,580 B2
(45) Date of Patent: Feb. 8, 2011

(54) CONSTANT-POWER BRUSHLESS DC MOTOR AND THE GENERATOR THEREBY

(76) Inventor: Oak-Jae Lee, 740-11 Doryang-dong, Gumi-si, Gyeongsangbuk-do 730-909 (KR)

( * ) Notice: Subject to any disclaimer, the term of this patent is extended or adjusted under 35 U.S.C. 154(b) by 220 days.

(21) Appl. No.: 12/097,712

(22) PCT Filed: Dec. 14, 2006

(86) PCT No.: PCT/KR2006/005465
§ 371 (c)(1),
(2), (4) Date: Nov. 17, 2008

(87) PCT Pub. No.: WO2007/069859
PCT Pub. Date: Jun. 21, 2007

(65) Prior Publication Data
US 2010/0052451 A1 Mar. 4, 2010

(30) Foreign Application Priority Data
Dec. 14, 2005 (KR) .................. 10-2005-0122818

(51) Int. Cl.
H02K 47/14 (2006.01)
H02P 11/00 (2006.01)

(52) U.S. Cl. .............. 322/39; 310/113; 310/68 B; 322/26; 318/400.4

(58) Field of Classification Search .......... 318/400.4, 318/432, 463, 400.29, 721; 322/31, 39; 310/68 B, 310/113
See application file for complete search history.

(56) References Cited

U.S. PATENT DOCUMENTS

| 4,228,396 | A | * | 10/1980 | Palombo et al. ............. 324/163 |
| 4,882,524 | A | * | 11/1989 | Lee ........................ 318/400.4 |
| 5,747,910 | A | | 5/1998 | Haner |
| 6,359,401 | B1 | * | 3/2002 | Garcia-Sinclair et al. 318/400.4 |
| 6,710,581 | B1 | | 3/2004 | Lee |
| 7,135,829 | B1 | * | 11/2006 | Sorkin ................... 318/400.07 |
| 2007/0210730 | A1 | * | 9/2007 | Lee ............................. 318/141 |
| 2009/0072776 | A1 | * | 3/2009 | Shin et al. .............. 318/400.37 |

OTHER PUBLICATIONS

International Search Report, dated Mar. 30, 2007, corresponding to PCT/KR2006/005465.

* cited by examiner

*Primary Examiner*—Burton Mullins
(74) *Attorney, Agent, or Firm*—Christie, Parker & Hale, LLP

(57) ABSTRACT

The present invention relates to a constant-power brushless DC motor and a generator using the same, and in particular, to a constant-power brushless DC motor and a generator using the same, which stably generates power upon load fluctuation. Since the stator is wound in parallel by phases and poles, the motor is realized to generate high power with low voltage and since the stator's winding is performed without interconnection, automatic production is realized to reduce costs and enable mass production. Accordingly, a generator constituted by using the above-described motor supplies high efficient power.

3 Claims, 12 Drawing Sheets

[Figure 1]
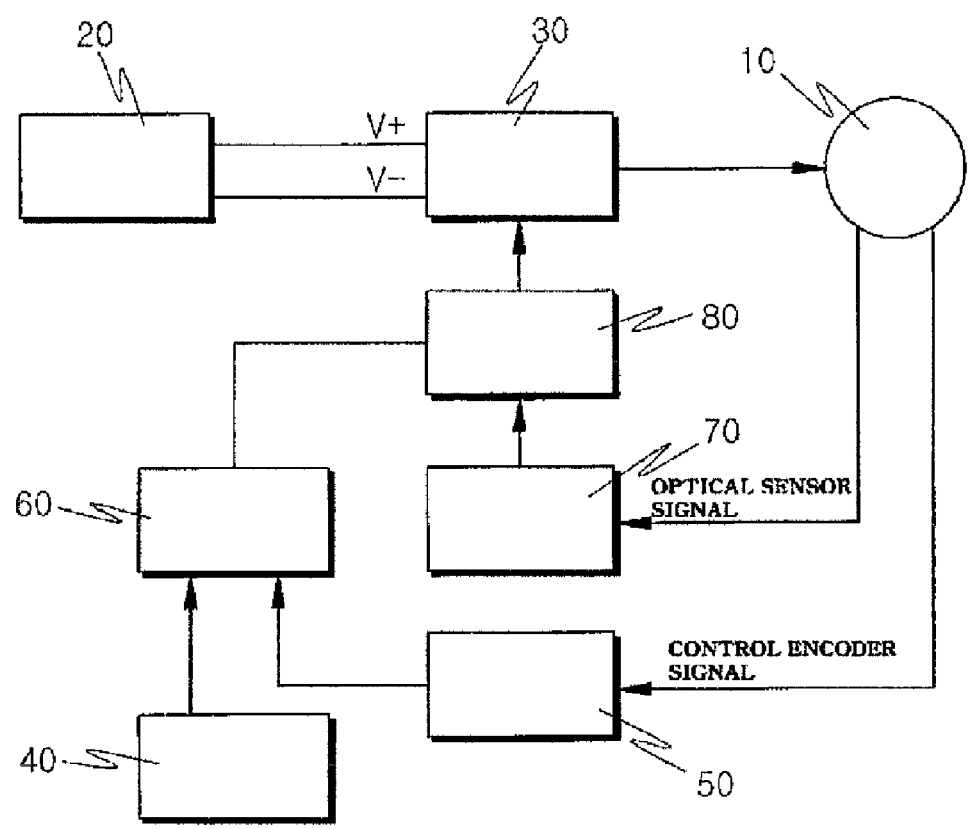

[Figure 2]
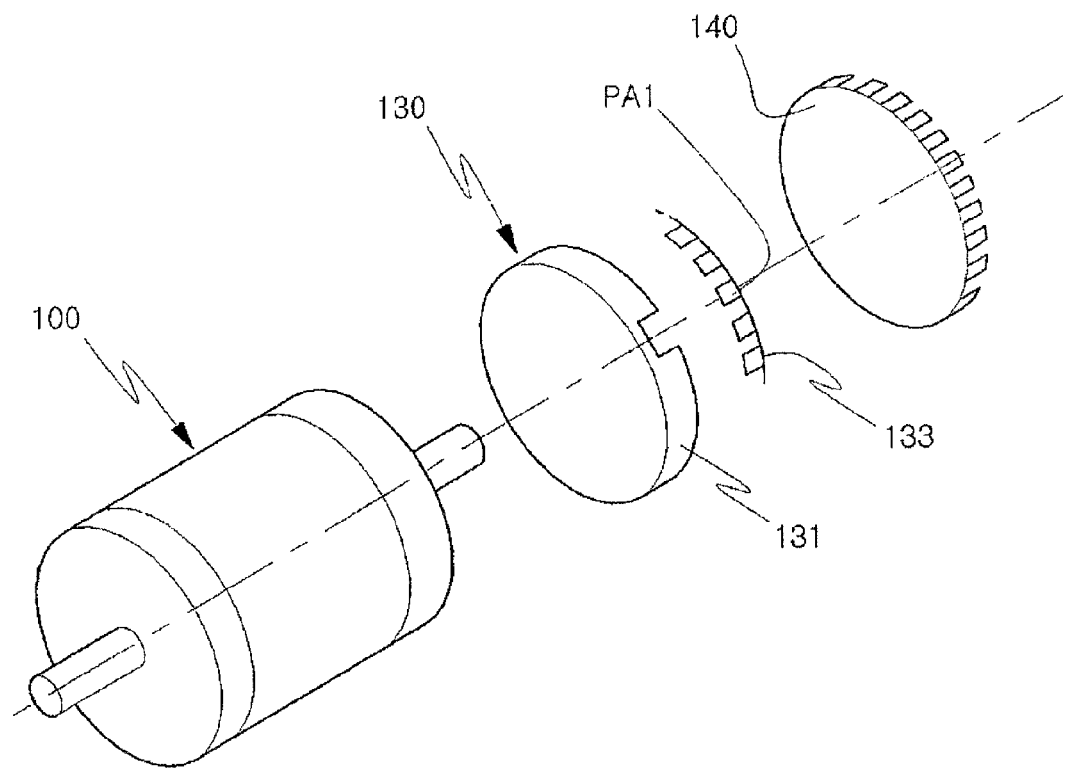

[Figure 3]
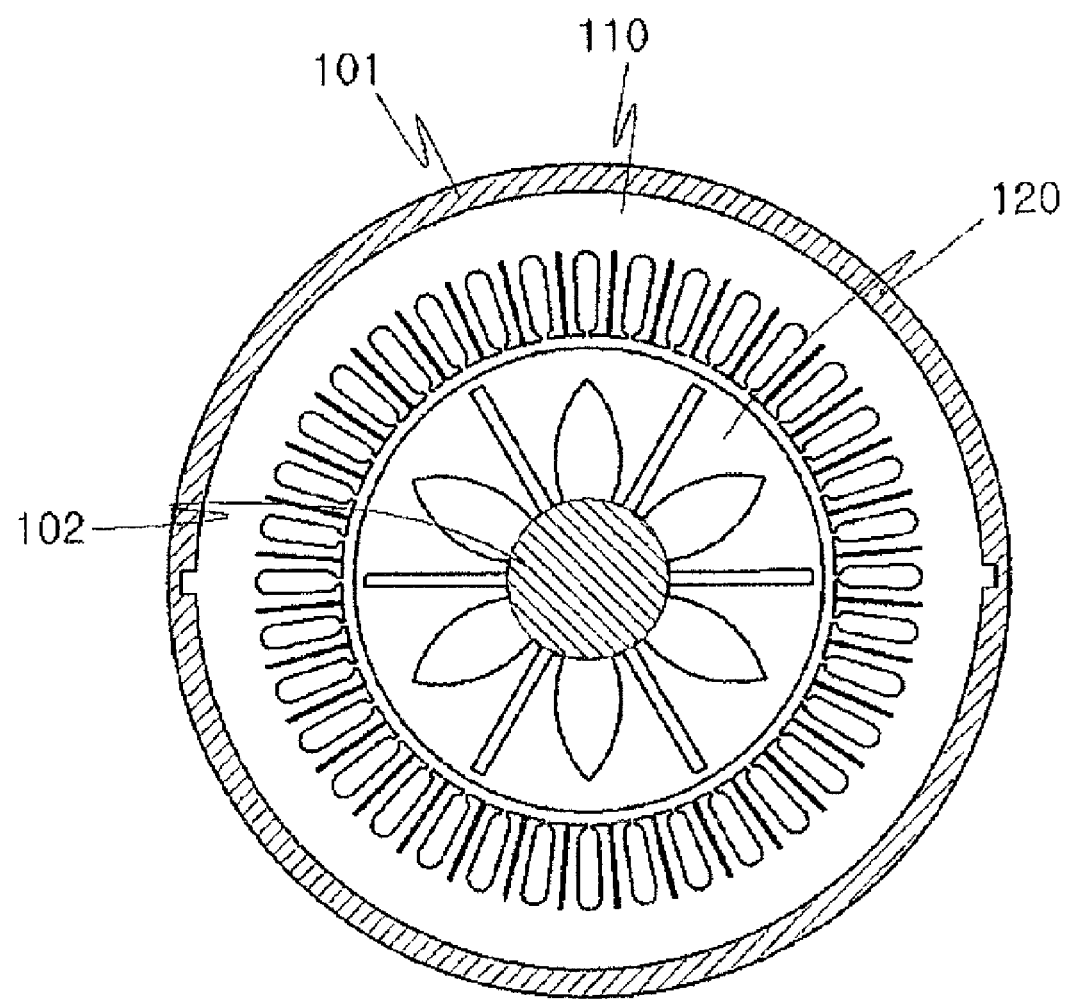

[Figure 4]
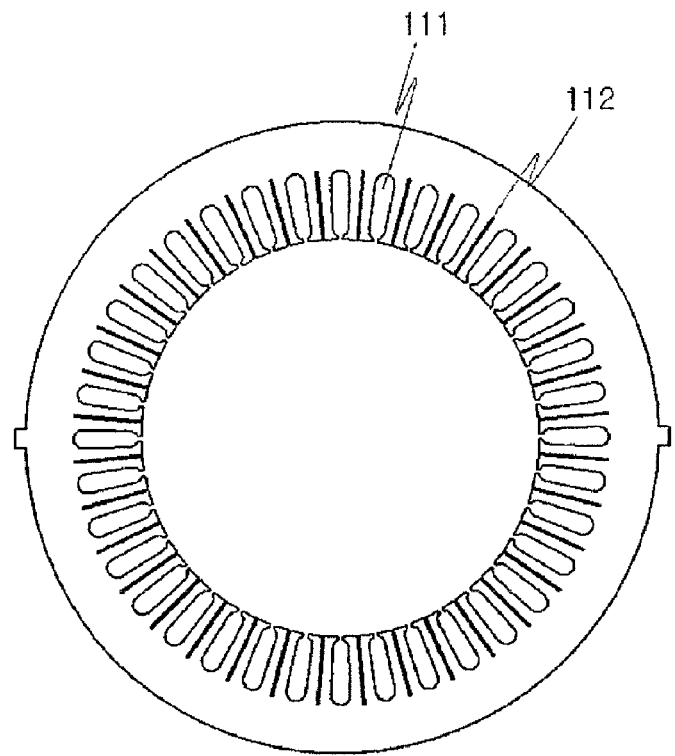
[Figure 5]
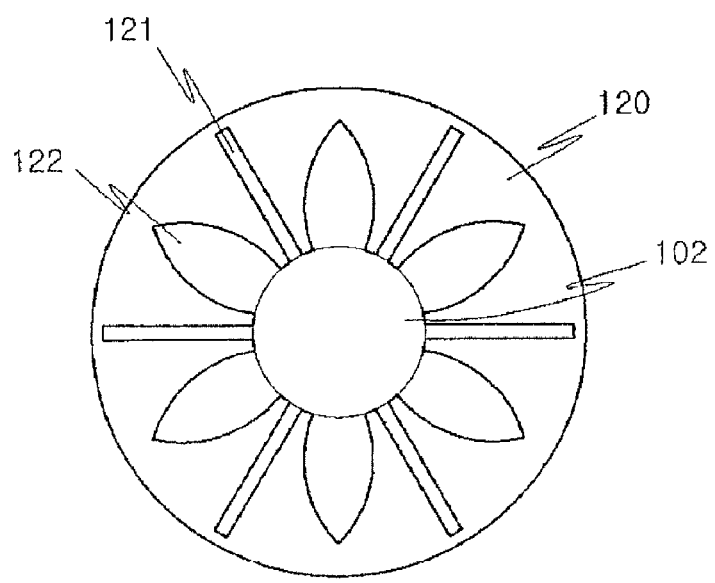

[Figure 6]
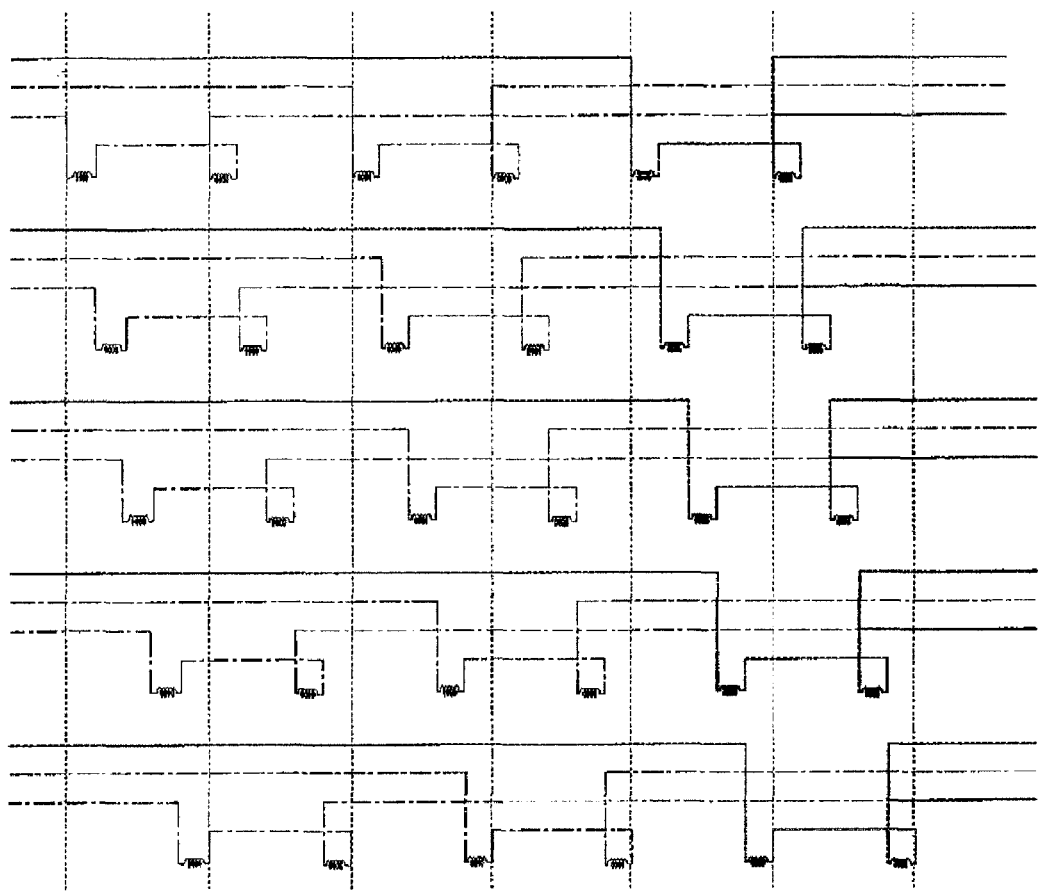

[Figure 7]
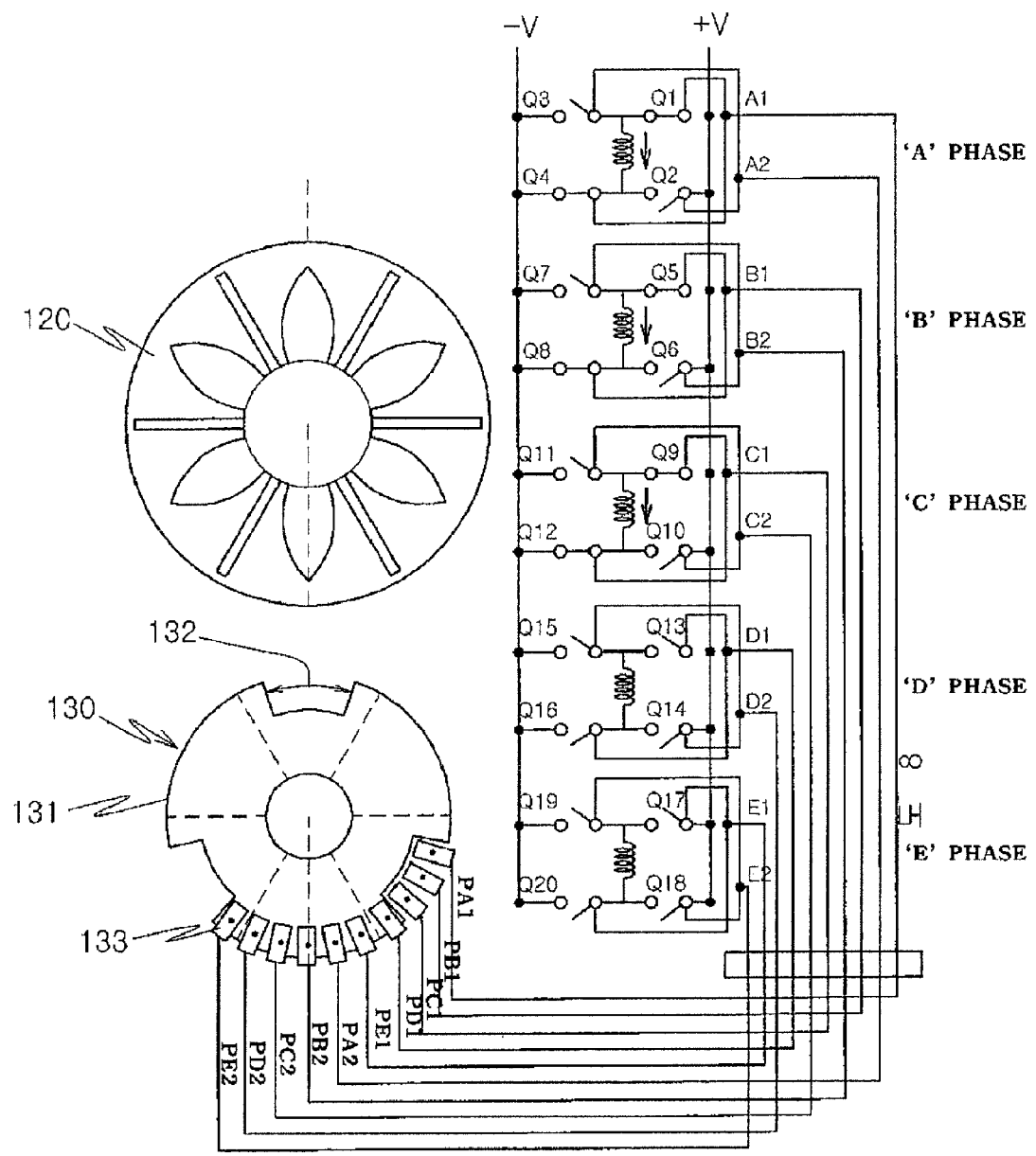

[Figure 8]
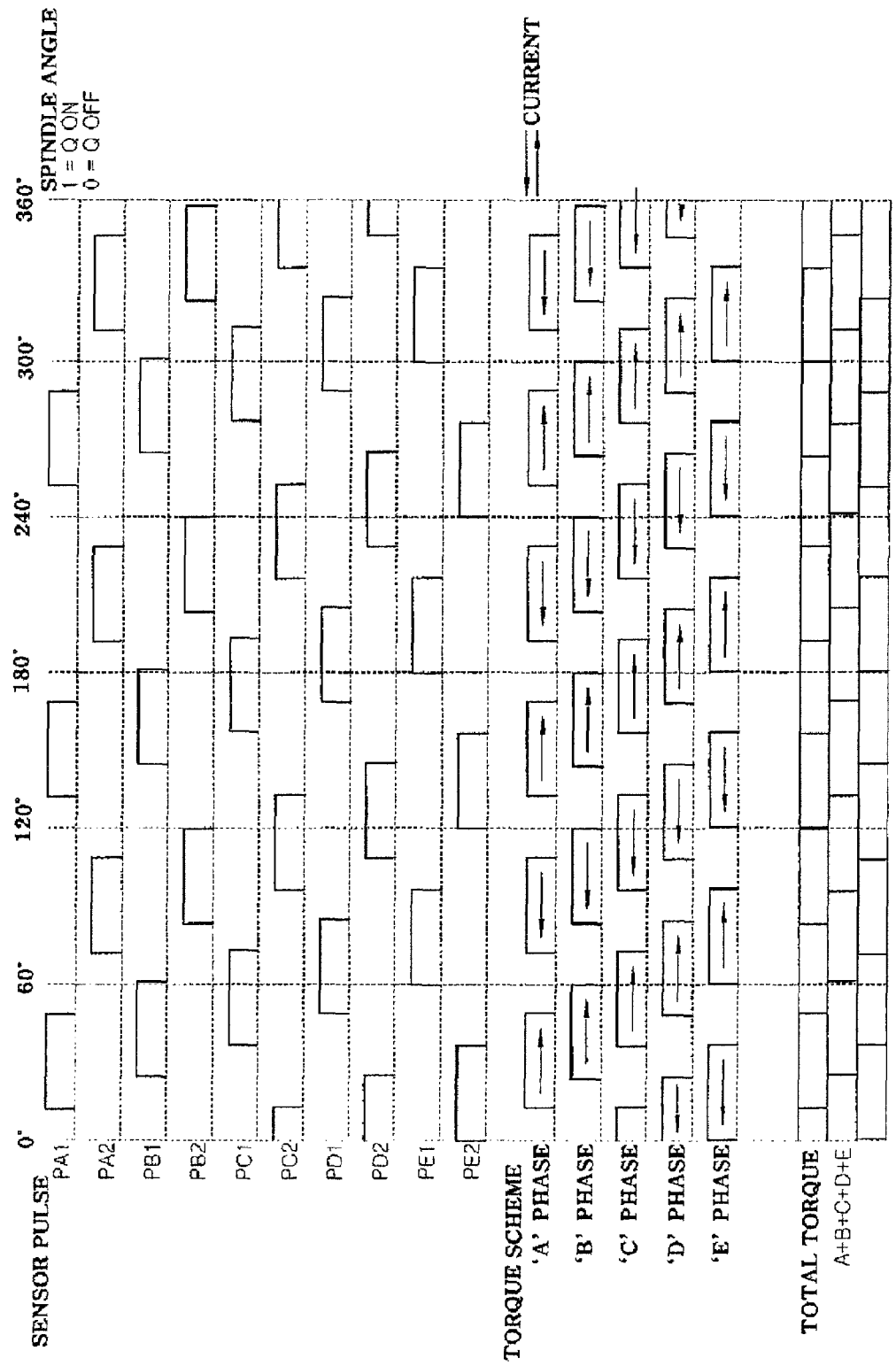

[Figure 9]
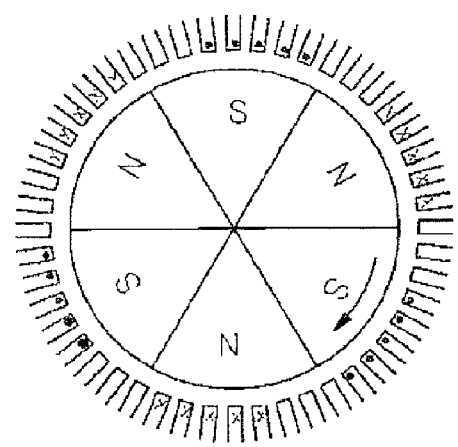
[Figure 10]
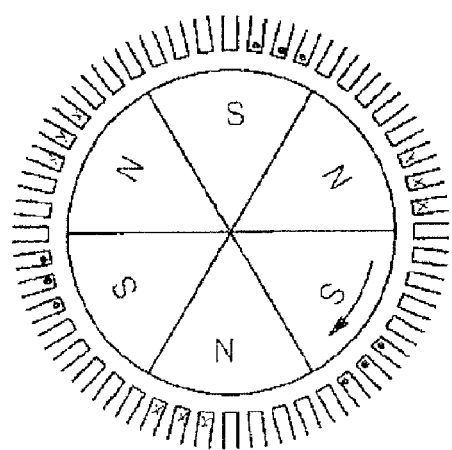

[Figure 11]
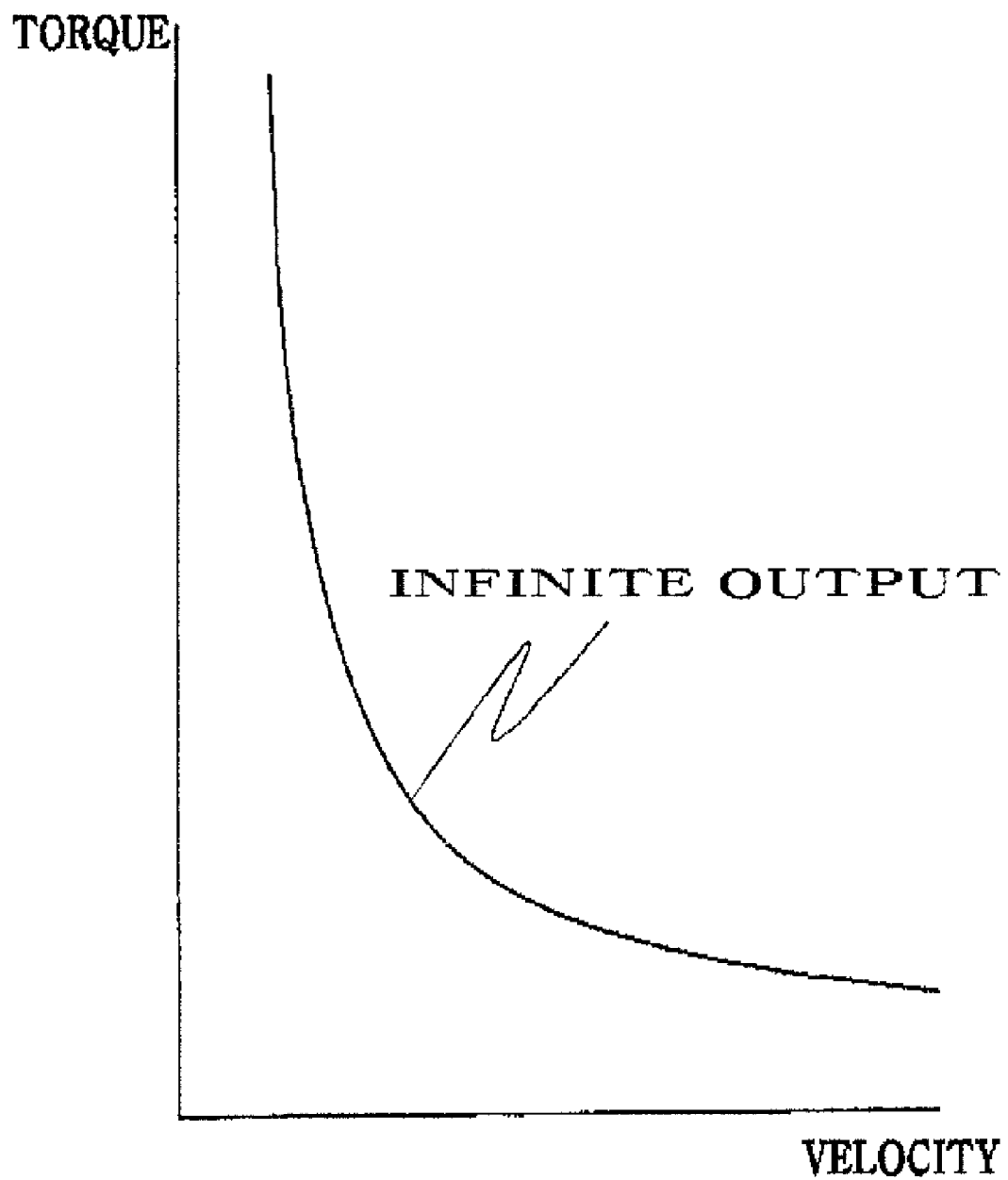

[Figure 12]
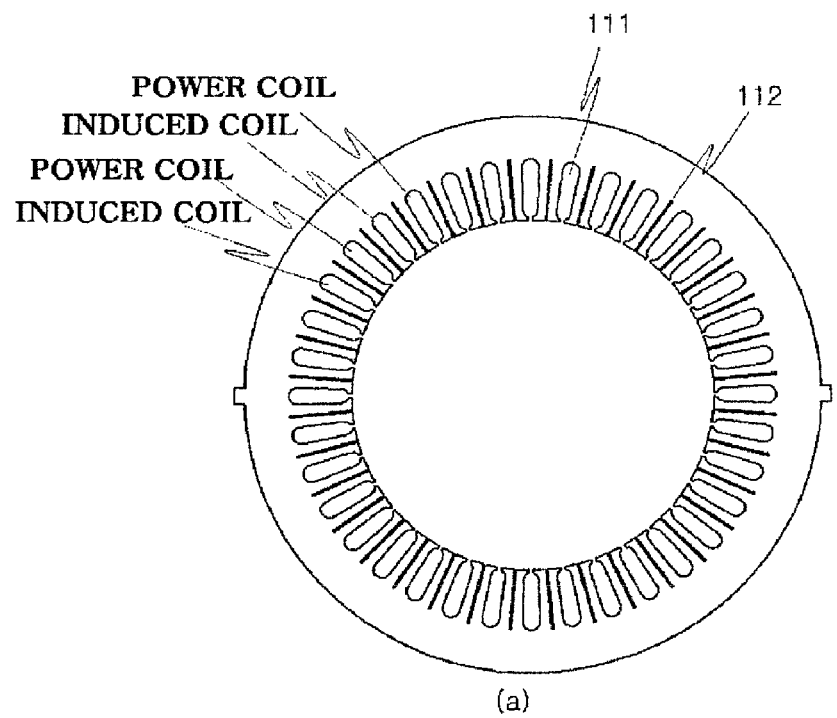
(a)
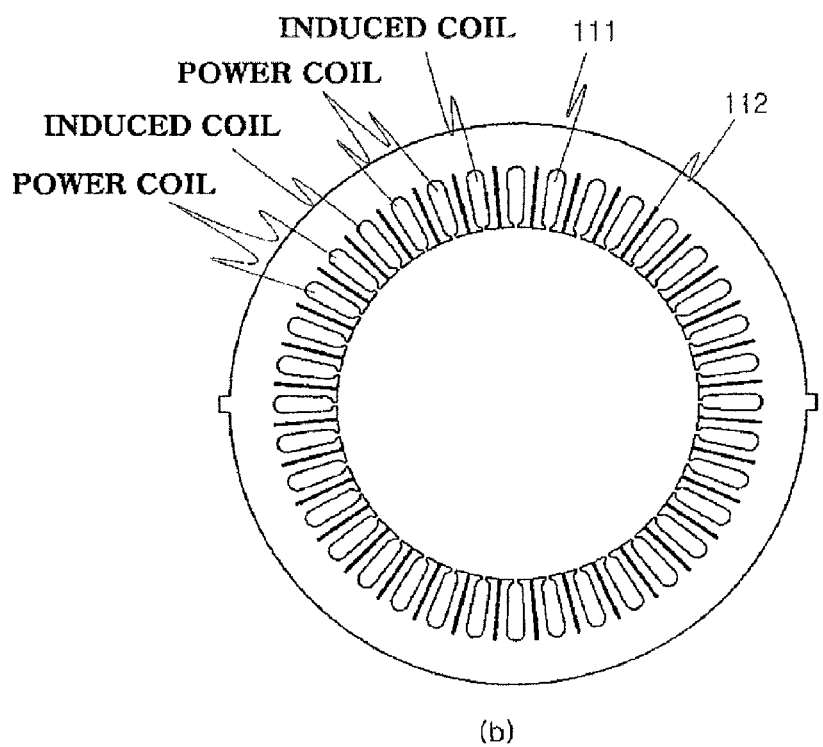
(b)

【Figure 13】
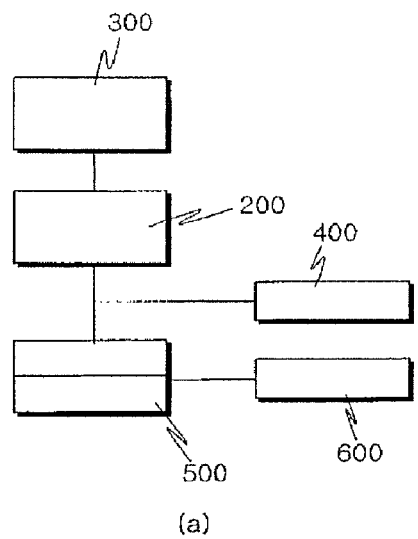
(a)
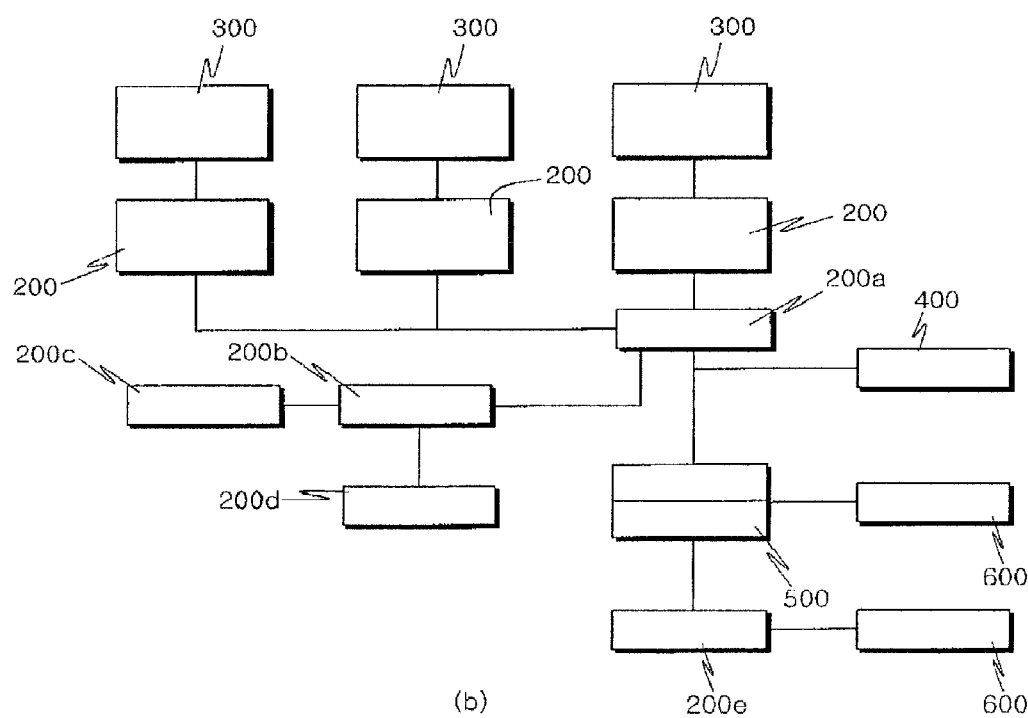
(b)

[Figure 14]
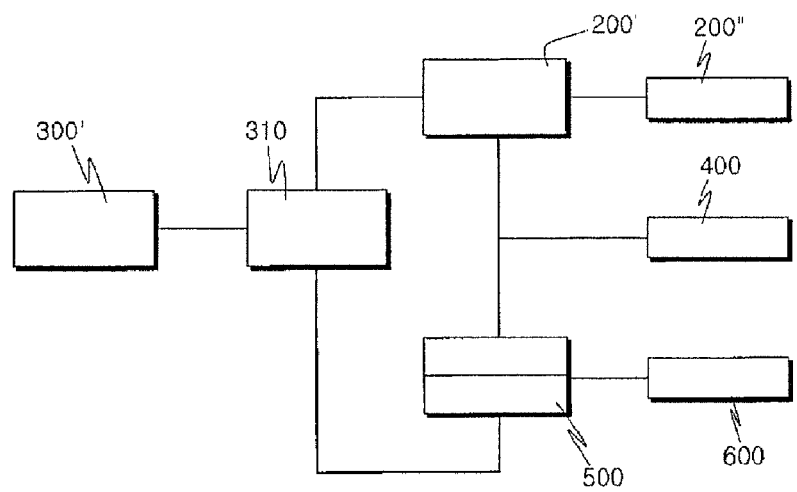
(a)
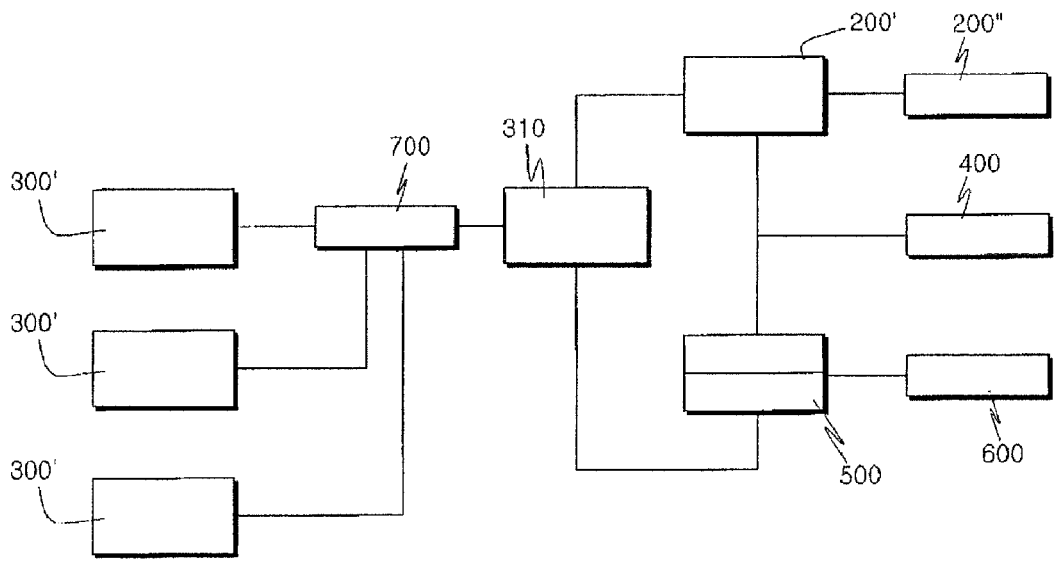
(b)

CONSTANT-POWER BRUSHLESS DC MOTOR AND THE GENERATOR THEREBY

CROSS-REFERENCE TO RELATED APPLICATION

This application is a National Phase Patent Application of International Application Number PCT/KR2006/005465, filed on Dec. 14, 2006, which claims the priority of Korean Patent Application No. 10-2005-0122818, filed Dec. 14, 2005.

TECHNICAL FIELD

The present invention relates to a constant-power brushless DC motor and a generator using the same, and in particular, to a constant-power brushless DC motor and a generator using the same, which stably generates power upon load fluctuation.

BACKGROUND ART

As a machine to generate rotation power by external electric power, a general electric motor selectively and correspondingly includes any one of a field magnet and an armature to generate a rotation magnetic field or induced electricity between a stator and a rotor. The electric motor is generally and widely used in the whole industries needing power.

Electric motors are divided into DC motors and AC motors by kinds of electric power. The DC motors include a separately excited motor, a shunt-wound motor, a compound motor, and a series-wound motor. The AC motors include an induction motor, a synchronous motor, and a commutation motor.

Among the DC motors, a brushless DC (BLDC) motor has advantages including reduced noise and longer lifetime because it does not have a point of mechanical contact, unlike a conventional brush DC motor. Therefore, BLDC motors are widely used as electric motors for industrial machines, electric home products, transportation machines, and the like.

In the BLDC motor, a hole sensor is used as a position sensor of a rotor, to control a phase of current which is applied to stator winding, relative to a pole of the rotor which is a permanent magnet.

DISCLOSURE OF INVENTION

Technical Problem

Among conventional electric motors, in a DC motor, a brush and a commutator are eroded. In a power motor, high speed rotation of 6,000 rpm or more is impossible, its structure is complicate, and it is expensive.

Further, in an AC inverter motor, start torque is weak, its controller is expensive, and constant-power is impossible. A reluctance motor is inferior in cost, size and weight, its controller is expensive and constant-power is impossible.

Technical Solution

The present invention provides a constant-power brushless DC motor and a generator using the same, which is simple in structure and easy in manufacture to reduce a production cost and which generates uniform power to stabilize power upon load fluctuation.

The present invention also provides a constant-power brushless DC motor and a generator using the same, which offers more stable power by constituting the generator using the constant-power brushless DC motor which generates uniform power.

According to an aspect of the present invention, there is provided a generator using a constant-power brushless DC motor comprising: a stator independently wound in parallel by phases and poles and configured of n phases, wherein each winding coil is connected to each of n full H-bridges, without interconnection, and the n full H-bridges are connected to a direct current power source in parallel; a rotor constituted to allow magnetic flux to be concentrated in an exciting area; a commutation encoder including a sensing region and a non-sensing region, in which the commutation encoder is externally positioned to one end of the shaft; and photo sensors, in which two photo sensors are positioned at each phase and connected to a half H-bridge of each phase, for turning on/off each half H-bridge. The rotor is constituted by stacking plates with a number of vacant spaces, wherein a number of bar type permanent magnets are positioned through the stacked plates; the commutation encoder is constituted by forming an interval of the sensing regions to allow a photo sensors to sense so that a (i.e., $1 < a \leq n-1$) phases, among n phases, are excited according to the interval of the sensing regions, wherein a shaft angle of the sensing region is determined by Formula 1, the number of the sensing regions in the commutation encoder is determined by the number of poles of the rotor/2, and a position interval of each photo sensor on a sensor plate is determined by Formula 2 so that the a phases, among the n phases, are always excited and b (i.e., $b = n - a$) phases are always inexcited; and the stator further comprises interference prevention slots between winding holes by which the windings are wound, wherein induction winding and power generation winding are wound through the winding holes at a winding interval controlled at various rates, both of the induction winding and power generation winding wound around the stator are used as the power generation winding, a power leading line is arranged, and a power supply is positioned at the shaft positioned in the center of the rotor to rotate the rotor, so that induced current by the rotation of the rotor is led to the power leading line connected to the power generation winding.

$$\text{Angle of sensing region } (°) = \frac{360° \times \text{number of phases to be excited}}{\text{number of poles of rotor} \times \text{number of phases of motor}} \quad \text{Formula 1}$$

$$\text{Position interval of each photo sensor } (°) = \frac{360°}{\text{number of poles} \times \text{number of phases}} \quad \text{Formula 2}$$

ADVANTAGEOUS EFFECTS

In the above-described constant-power brushless DC motor used for the present invention, since the stator is wound in parallel by phases and poles, the motor is realized to generate high power with low voltage. Since the stator's winding is performed without interconnection, automated production is realized to reduce costs and enable mass production. Since the magnetic flux is focused on the region of the rotor so that it may be the passive magnetic flux of the rotor corresponding to the active magnetic flux of the stator, the high-power motor is realized by the rotor of a permanent magnet. Since the number of poles, size and shape of the rotor are not restricted, a long motor or a pancake motor is freely designed for purposes.

Meantime, a conventional motor, which uses full sine wave or full square wave, generates brake torque, back electromotive force (EMF), reactance (inductive reactance and capacitive reactance), and harmonic wave in the pole changing area. Since these result in iron loss or copper loss in the motor, impact on the controller, and generate heat in the motor, a cooling system is required and the efficiency of the motor is deteriorated. However, in the motor of the present invention, since current is not input in the phase positioned in the pole changing area, all problems of the conventional motor are solved, so that no cooling system is needed and the efficiency of the motor is improved.

Furthermore, since the stator and the rotor are formed by stacking the same silicon steel plates, the density of the magnetic flux or permeability are identical between the stator and the rotor. Consequently, the characteristics of current and torque are good and the relational characteristics of current and speed are also good, resulting in the constant-power characteristic and the similar efficiency in all speed ranges.

Furthermore, since partial square wave is input in the winding coil of each phase, the total of torque becomes the linear torque even though each phase realizes a square torque scheme. Consequently, no torque ripple occurs and the motor smoothly starts and rotates.

Therefore, since the generator according to the present invention uses the permanent magnet by employing the above-described constant-power brushless DC motor, it supplies highly-efficient and stable electric power.

DESCRIPTION OF THE DRAWINGS

The above and other features and advantages of the present invention will become more apparent by describing in detail exemplary embodiments thereof with reference to the attached drawings in which:

FIG. 1 is a block diagram of a constant-power brushless DC motor used for the present invention;

FIG. 2 is a schematic perspective view illustrating an example of the constant-power brushless DC motor;

FIG. 3 is a plan view of a rotor and a stator in a generator according to the present invention;

FIG. 4 is a plan view of the stator in the generator according to the present invention;

FIG. 5 is a plan view of the rotor in the generator according to the present invention;

FIG. 6 illustrates an example of stator winding in the constant-power brushless DC motor;

FIG. 7 illustrates a polarity control circuit in the constant-power brushless DC motor;

FIG. 8 illustrates power torque generated when three-phases are excited in the constant-power brushless DC motor;

FIG. 9 illustrates that the interval of three phases is advanced-commutated in the constant-power brushless DC motor;

FIG. 10 illustrates that the interval of five phases is advanced-commutated in the constant-power brushless DC motor;

FIG. 11 is a graph illustrating a constant-power characteristic of the constant-power brushless DC motor;

FIG. 12 illustrates an arrangement of stator winding in motor/generator using the constant-power brushless DC motor;

FIG. 13 is a block diagram illustrating an example of a natural power generator using the constant-power brushless DC motor; and FIG. 14 is a block diagram illustrating an example of a circular power generator using the constant-power brushless DC motor.

EXPLANATION ON ESSENTIAL ELEMENTS OF DRAWINGS

10: BLDC motor
20: DC power source
30: power switch
40: control signal input unit
50: speed controller
60: PWM controller
70: polarity controller
80: driving unit
100: motor body
102: same shaft
110: stator
111: winding hole
112: interference prevention slot
120: rotor
121: permanent magnets
122: vacant spaces
130: commutation encoder
131: round plate
132: sensing region
133: sensing plate
PA1~PE2: photo sensors
140: control encoder
200: generator
200': motor/generator
200": power load
200a: current collector
200b: transformer
200c: power transmitter/power distributor
200d: high/low pressure loads
200e: electricity storing system
300: power source
300': battery
310: charge-discharge controller
400: AC load
500: commutator/charger
600: DC load
700: switching unit

MODE FOR THE INVENTION

The present invention will now be described more fully hereinafter with reference to the accompanying drawings, in which preferred embodiments of the invention are shown.

As illustrated in FIG. 1, the whole system of a DC electric motor includes a BLDC motor 10, a DC power source 20 and a power switch 30, a control signal input unit 40, a speed controller 50, a pulse width modulation (PWM) controller 60, a polarity controller 70, and a driving unit 80.

The DC power source 20 commutates commercial alternating current to be converted to direct current or it is realized as a battery, thereby supplying direct current power V+ and V− to the power switch 30. The power switch 30 turns on/off a switching device according to a driving signal of the driving unit 80, thereby transferring the power of the DC power source 20 to stator induction winding of the brushless DC motor 10.

Since the power switch 30 is intended to apply the direct power to the stator winding, its configuration may vary depending on a kind of an electric motor, that is, the number of phases of the stator winding. In an embodiment of the present invention, for example, the stator winding having five phases will be illustrated and described.

Further, four switching devices Q1, Q2, Q3 and Q4 are needed to drive one phase. These switching devices are connected in an 'H' shape, which is called 'H-bridge'. The power switch 30 includes a number of H-bridges, and the switching devices may employ a transistor, an IGBT, a MOSFET, a FET, and the like.

The input unit 40 provides an instruction signal to instruct a rotation speed of the motor by an operation of an operator. The PWM controller 60 generates a PWM signal to control the rotation speed of the motor, according to an instruction value of the input unit 40 and a control signal of the speed controller 50.

Upon closed loop control, the speed controller 50 receives a control encoder signal from the BLDC motor 10 and sends a speed control signal to the PWM controller 60. The polarity controller 70 receives a photo sensor signal from the BLDC motor 10 and sends the photo sensor signal to the driving unit 80. The driving unit 80 receives the photo sensor signal of the polarity controller 70 and the PWM signal of the PWM controller 60 and supplies a driving signal to control the switching devices of the power switch 30.

The BLDC motor 10 according to the present invention may be freely configured, depending on requirements for specific applications, in terms of the number of phases of the stator and the number of poles of the rotor. However, in this embodiment, for example, the stator has five phases and the rotor has six poles, that is, three N poles and three S poles.

The BLDC motor 10 used for the present invention has multi-phases of 2, 3, 4, 5, 6, . . . , n phases. The BLDC motor 10 is configured as a multi-phase type motor having 2, 3, 4, 5, . . . , a ($1 < a \leq n-1$) phases which are excited, and 2, 3, 4, 5, . . . , b (b=n−a) phases which are inexcited, to alternately start and rotate the excited phases and inexcited phases.

As illustrated in FIGS. 2 through 5, the BLDC motor includes a motor body 100 with a stator 110 and a rotor 120, a commutation encoder 130 connected to the rotor 120 on the same shaft 102, and a control encoder 140.

In the embodiment of the present invention, the commutation encoder 130 and the control encoder 140 are externally positioned on one end of the shaft 102 of the rotor outside a bracket on the back of the motor body, so that the commutation encoder 130 and the control encoder 140 rotate, together with the rotor 120.

Further, the commutation encoder 130 includes a round plate 131 having a sensing region and a non-sensing region, and a sensor plate 133 with photo sensors PA1 to PE2. The sensor plate 133 is positioned, along the circumference of the bracket.

The sensor plate 133 may be adjustably positioned at a position where advanced commutation may be performed.

The control encoder 140 includes openings formed in a round plate as shown, so that the photo sensors emit pulses through the openings. A size of the opening and a partition angle to form the openings may be properly determined based on the characteristics of speed control or position control of the motor.

As illustrated in FIGS. 3 and 4, the stator 110 of the BLDC motor is formed by laminating a number of silicon steel plates. A winding hole 111 is formed in each plate. As illustrated in FIG. 6, stator winding is wound in the winding hole.

As illustrated in FIGS. 4 and 6, thirty winding holes 111 are formed for the winding of the 5-phase 6-pole stator 110. Each of five phases A, B, C, D and E is independently wound in parallel. Induction winding and power generation winding are properly alternately wound as necessary.

That is, a ratio of the induction winding to the power generation winding may be varied, for example, 1:1, 1:2, 2:1, etc.

Further, an interference prevention slot 112 is formed in the stator 110 by cutting each winding portion, to prevent a magnetic field, which is induced by the winding, from affecting another winding, that is, to prevent the windings from being interfered with one another.

The rotor 120 is constructed by positioning a number of bar-shaped permanent magnets 121 to penetrate through a plate surface and by stacking a number of thin plates.

Further, a number of vacant spaces 122 are formed in the rotor 120. The plates constituting the rotor 120, which is formed by stacking a number of thin plates, are connected to one another, by using a dove tail type holder of a nonmagnetic hub.

As illustrated in FIG. 7, the commutation encoder 130 includes the round plate 131 having the sensing region 132 and the non-sensing region, and the sensor plate 133 to which the photo sensors PA1 to PE2 are attached.

The sensing region 132 and the non-sensing region of the round plate 131 are determined based on the number of phases of the stator, the number of poles of the rotor, and the number of excited phases. While rotating, together with the shaft 102 of the rotor, the round plate 131 turns on the photo sensor in the sensing region 132 so that corresponding stator winding is excited, and turns off the photo sensor in the non-sensing region so that corresponding stator winding is not excited.

Specifically, in the present invention, the size of the sensing region is properly controlled to allow only a phases, among n phases, to be excited.

Further, in the present invention, each phase has pairs of photo sensors PA1 and PA2; PB1 and PB2; . . . , and PE1 and PE2, and each phase is configured to operate in connection with the commutation encoder 130.

One pair of photo sensors and another pair of photo sensors in one phase are positioned to be spaced apart from each other with an angle of the interval between the poles of the rotor. Each pair of the photo sensors of each phase is sequentially positioned with the angle of the interval between the phases.

When the number of phases is n, n pairs of photo sensors, that is, 2n photo sensors, sense the rotor's position. A sensing signal of the photo sensor is transferred to the power switch 30 to instruct the direction and interval of the current flowing in the stator winding, so that the motor starts and rotates.

As illustrated in FIG. 7, the power switch 30 in the present invention includes five full H-bridges and turns on/off corresponding switching elements Q1 to Q20 according to a signal from the photo sensor of the commutation encoder 130.

Specifically, in FIG. 7, the H-bridge of A phase includes the switching elements Q1 and Q4, which are turned on/off by the signal from the photo sensor PA1, and the switching elements Q2 and Q3, which are turned on/off by the signal from the photo sensor PA2. The stator winding of the A phase is connected between the above switching elements as shown. The H-bridge of B phase includes the switching elements Q5 and Q8, which are turned on/off by the signal from the photo sensor PB1, and the switching elements Q6 and Q7, which are turned on/off by the signal from the photo sensor PB2. The stator winding of the B phase is connected between the above switching elements as shown. Likewise, the H-bridges of C through E phases are connected.

In the sensor plate 133 of the commutation encoder 130, a pair of the photo sensors PA1 and PA2, corresponding to the A phase, are positioned at a predetermined interval, and a pair of the photo sensors PB1 and PB2, corresponding to the B phase, are respectively positioned next to the photo sensors PA1 and PA2. Likewise, the photo sensors PC1, PD1, PE1, . . . , PC2, PD2 and PE2 are connected.

A pair of photo sensors senses the poles of the rotor. When the photo sensor PA1 senses the N pole of the rotor, the photo sensor PA2 needs to be positioned to sense the S pole of the rotor. Similarly, the photo sensors are positioned to prevent a pair of the photo sensors from being turned on simultaneously. Specifically, the present invention improves the performance by making the number of excited phases, among the n phases, be equal to or less than n−1 and properly controlling the positions of the photo sensors for the advanced commutation.

The embodiment of FIG. 7 illustrates that three phases of five phases are excited. Among the photo sensors PA1 through PE1, which are sequentially positioned to sense the N pole, the photo sensors PA1, PB1 and PC1 are turned on in the sensing region to turn on the switching elements Q1 and Q4 of the H-bridge of the A phase, the switching elements Q5 and Q8 of the H-bridge of the B phase, and the switching elements Q9 and Q12 of the H-bridge of the C phase, so that the remaining switching elements are turned off.

Accordingly, current flows in the stator windings of the A, B and C phases, in the direction of the arrow as shown.

In realizing the commutation encoder 130 according to the present invention, the number of the photo sensors positioned in the sensing region 132 is determined as half (½) the number of poles of the rotor. An interval of the sensing regions, that is, a shaft angle, is determined by Formula 1.

$$\text{Angle of sensing region } (°) = \frac{360° \times \text{number of phases to be excited}}{\text{number of poles of rotor} \times \text{number of phases of motor}} \quad \text{Formula 1}$$

Accordingly, since only 3 phases are excited in the 5-phase 6-pole motor, the shaft angle of the sensing region is 36°.

In FIG. 7, when one phase is excited, the photo sensor PA1, which is connected to the switching elements Q1 and Q4 of the half H-bridge of one phase, and the photo sensor PA2, which is connected to the switching elements of Q2 and Q3 of the other H-bridge of the phase, are respectively positioned on the same position of different poles. Accordingly, when the circuit is electrified, the photo sensor PA1 of the phase is positioned in the sensing region, to emit a positive pulse, so that the switching elements Q1 and Q4 of the half H-bridge are turned on to electrify the stator winding. Thereby, the corresponding stator winding looped by the switching elements Q1 and Q4 is excited.

While the rotor 120 rotates, a turn-on interval of the switching elements Q1 and Q4 of the half H-bridge is identical to a width of the sensing region of the commutation encoder 130.

That is, an excitation interval of the switching elements Q1 and Q4 of the half H-bridge is the shaft angle of 36°. While the shaft angle is 24° (60° to 36°), the photo sensors PA1 and PA2 are positioned in the non-sensing region so that the switching elements Q1, Q4, Q2 and Q3 of the H-bridge of one phase are all off. Then, like the photo sensor PA1, the photo sensor PA2 turns on the switching elements Q2 and Q3 as the commutation encoder 130 rotates, so that the phase is independently electrified to start and rotate the rotor 120.

A position interval (°) of positioning the photo sensors on the sensor plate 133 of FIG. 7 is determined by Formula 2.

$$\text{Position interval of each photo sensor } (°) = \frac{360°}{\text{number of poles} \times \text{number of phases}} \quad \text{Formula 2}$$

Accordingly, since the number of the photo sensors in FIG. 7 is ten, the position interval is 12°. The interval between two photo sensors of each phase is determined by dividing 360° by the number of poles of the rotor, and thus the interval between the photo sensors PA1 and PA2 is 60°.

As shown, in the 5-phase 6-pole motor, three phases are always exited and two phases are always inexcited. Here, an excitation interval of each phase is determined by Formula 3, and an inexcitation interval of each phase is determined by Formula 4.

$$\text{Excited electrical angle } (°) = 180° \times \frac{\text{number of excited phases}}{\text{number of phases of motor}} \quad \text{Formula 3}$$

$$\text{Inexcited electrical angle } (°) = 180° \times \frac{\text{number of inexcited phases}}{\text{number of phases of motor}} \quad \text{Formula 4}$$

Accordingly, the excited electrical angle of each phase is 108° and the inexcited electrical angle is 72°.

FIG. 8 illustrates a pulse being sent from each photo sensor, an input direction of current, and an interval and an outline of torque in the 5-phase 6-pole motor according to the present invention.

A coil is electrified by current having the interval identical to the pulse being sent from each photo sensor, depending on the interval of the sensing regions 132 of the commutation encoder 130, so that torque is generated. Current of partial square wave is input and power of square wave torque is output.

Accordingly, in the 5-phase 6-pole motor, three phases are always excited and two phases are always inexcited, and the total of torque is a linear torque scheme.

In a motor having multi-phases and multi-poles, the number of phases to be excited is determined based on the interval of the sensing regions in the commutation encoder.

Accordingly, the motor of the present invention is configured so that one or more phases, among multi-phases, are inexcited because the advanced commutation is needed to solve all problems occurring in a pole changing area and to allow the high-speed rotation to be smoothly performed.

When the motor converts electrical energy into kinetic energy, there are the timing that the stator coil is electrified to be excited to allow active magnetic flux to generate magnetic motive force and the timing that passive magnetic flux of the rotor which rotates at high speed is operated. Since the active magnetic flux is delayed than the passive magnetic flux in terms of the timing, the advanced commutation is needed to make the timing coincide with each other.

FIG. 9 illustrates an 8-phase 6-pole motor, in which only five phases are excited, according to another embodiment of the present invention, and FIG. 10 illustrates the 8-phase 6-pole motor in which only three phases are excited.

The motor of FIG. 9 is rotated at higher speed, than the motor of FIG. 10. Thus, when a super-high speed motor is constituted, the polarity controller 70 positions each photo sensor to be advanced and performs an electronic combination change with the advanced sensor by a microprocessor, thereby performing gradual advanced commutation according to a speed.

FIG. 11 illustrates a relation of torque and speed in the constant-power brushless DC motor.

As shown, the DC motor of the present invention has the power characteristic that the relation of torque and speed is not changed.

Further, the DC motor of the present invention has clockwise (CW) and counter-clockwise (CCW) rotation capability, thereby providing a bi-directional operation.

That is, when the polarity controller 70 performs the electronic combination change of a dual photo sensor held in each phase, the motor smoothly starts and rotates from forward direction to reverse direction or from reverse direction to forward direction. When the electronic combination change of the photo sensor is frequently performed within 5/1000 sec, the bi-directional operation is smoothly activated. Further, the motor of the present invention may be realized in a linear type.

A generator using the above-described motor is constructed as illustrated in FIGS. 12 through 14.

FIG. 12 illustrates a generator using the constant-power brushless DC motor according to the present invention. A motor/generator is constituted by using the winding wound around the stator as a power generation coil, disposing a power leading line in the stator winding, and disposing a power supply unit in an induction coil.

In FIG. 13, the winding wound around the stator 110 in one or a number of the constant-power brushless DC motors to which the present invention is applied, is used as the power generation coil. The power leading line is arranged at the power generation coil to connect loads 400 and 600. A power source 300 is positioned at the shaft 102 positioned in the center of the rotor 120.

When the power source 300 positioned in the shaft 102 of the rotor is driven to rotate the rotor 120, a magnetic force is induced. By the induced magnetic force, current is induced to the power generation coil of the stator. The current is supplied to loads or a current collector 200a, a commutator/charger 500, and a transformer 200b, through the power leading line.

Since wind power or hydraulic power may be used as the power source, a bi-directional propeller and the like being rotated by the wind power or hydraulic power may be used to constitute a natural power generator.

In FIG. 14, one or a number of power supply units (e.g., a battery 300') are connected to the induction coil of the motor/generator to supply electric power, so that a rotation magnetic field is generated in the induction coil. By the rotation magnetic field, the rotor 120 is rotated, and the induced current generated by the rotation of the rotor 120 is induced to the power generation coil wound around the stator 110 so that it may be led to the power leading line.

The led current is commutated or amplified by the commutator or amplifier so that it may be supplied to a desired load. Some of the current is supplied to the power supply unit which is the power source, that is, the battery 300' so that it may be stored to allow the induction coil to be excited again, thereby constituting a circular power generator.

In the circular power generator, not only an alternating current load 400 and a direct current load 600 but also a power load 200" may be employed.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A generator using a constant-power brushless DC motor, comprising:

the motor comprising:
a stator independently wound in parallel by phases and poles and configured of n phases, wherein each winding coil is connected to each of n full H-bridges, without interconnection, and the n full H-bridges are connected to a direct current power source in parallel;
a rotor including a shaft positioned in the center of the rotor, wherein the rotor is constituted to allow magnetic flux to be concentrated in an exciting area;
a commutation encoder including a sensing region and a non-sensing region, wherein the commutation encoder is externally positioned to one end of the shaft; and
photo sensors, wherein two photo sensors are positioned at each phase and connected to a half H-bridge of each phase, for turning on/off each half H-bridge, wherein,
the rotor is constituted by stacking plates with a number of vacant spaces, wherein a number of bar type permanent magnets are positioned through the stacked plates;
the commutation encoder is constituted by forming an interval of the sensing regions to allow a photo sensors to sense so that a (i.e., $1 < a \leq n-1$) phases, among n phases, are excited according to the interval of the sensing regions, in which a shaft angle of the sensing region is determined by Formula 1, the number of the sensing regions in the commutation encoder is determined by half (½) the number of poles of the rotor, and a position interval of each photo sensor on a sensor plate is determined by Formula 2 so that the a phases, among the n phases, are always excited and b (i.e., b=n−a) phases are always unexcited; and
the stator further comprises interference prevention slots between winding holes by which the windings are wound, in which induction winding and power generation winding are alternately wound through the winding holes at a winding interval controlled at various rates, a power leading line is arranged to the power generation winding of the windings wound around the stator, and induced current of the stator generated by the rotation of the rotor by power supply of the induction winding is induced to the power leading line arranged to the power generation winding.

$$\text{Angle of sensing region (°)} = \frac{360° \times \text{number of phases to be excited}}{\text{number of poles of rotor} \times \text{number of phases of motor}} \quad \text{Formula 1}$$

$$\text{Position interval of each photo sensor (°)} = \frac{360°}{\text{number of poles} \times \text{number of phases}} \quad \text{Formula 2}$$

2. The generator of claim 1, wherein the power leading line is arranged so that the induction winding and the power generation winding wound around the stator are all power generation windings, and a power supply source including a bidirectional propeller rotating by wind or water flow is installed to a shaft positioned at the center of the rotor to rotate the rotor so that the induced current generated by the rotation of the rotor is induced to the power leading line connected to the power generation winding.

3. The generator of claim 1, wherein the power leading line is positioned at the power generation winding among the windings wound around the stator, and one or a number of power supply units are positioned at the induction winding, to supply power to generate a circular magnetic field and to rotate the rotor, so that the induced current generated by the rotation of the rotor is led to the power generation winding wound around the stator and is used for power loads, AC loads and DC loads, by further comprising a commutator for commutating output electricity to direct current, one or more chargers for charging the electricity, a charge-discharge controller for controlling charge and discharge of the chargers, and a switching unit for controlling a circuit connection of the charger and the power supply unit.

\* \* \* \* \*

UNITED STATES PATENT AND TRADEMARK OFFICE
CERTIFICATE OF CORRECTION

| | | |
|---|---|---|
| PATENT NO. | : 7,884,580 B2 | Page 1 of 1 |
| APPLICATION NO. | : 12/097712 | |
| DATED | : February 8, 2011 | |
| INVENTOR(S) | : Oak-Jae Lee | |

It is certified that error appears in the above-identified patent and that said Letters Patent is hereby corrected as shown below:

In the Claims

Column 12, Claim 3, line 2    Delete "circular"

Insert -- rotation --

Signed and Sealed this

Twentieth Day of December, 2011

David J. Kappos
*Director of the United States Patent and Trademark Office*